US010885310B2

(12) United States Patent
Mathwig

(10) Patent No.: US 10,885,310 B2
(45) Date of Patent: Jan. 5, 2021

(54) SYTEMS AND METHODS FOR OBJECT RECOGNITION AND ASSOCIATION WITH AN IDENTITY

(71) Applicant: JPMorgan Chase Bank, N.A., New York, NY (US)

(72) Inventor: Jeffrey Dean Mathwig, Worthington, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 168 days.

(21) Appl. No.: 15/999,146

(22) Filed: Aug. 17, 2018

(65) Prior Publication Data

US 2019/0057248 A1 Feb. 21, 2019

Related U.S. Application Data

(60) Provisional application No. 62/546,717, filed on Aug. 17, 2017.

(51) Int. Cl.
*G06K 9/00* (2006.01)
*G06K 9/32* (2006.01)
*G06K 9/62* (2006.01)
*G06F 16/51* (2019.01)
*G06F 16/583* (2019.01)

(52) U.S. Cl.
CPC ......... *G06K 9/00255* (2013.01); *G06F 16/51* (2019.01); *G06F 16/5854* (2019.01); *G06K 9/00281* (2013.01); *G06K 9/00295* (2013.01); *G06K 9/00771* (2013.01); *G06K 9/3241* (2013.01); *G06K 9/6215* (2013.01); *G06K 9/00577* (2013.01)

(58) Field of Classification Search
None
See application file for complete search history.

(56) References Cited

U.S. PATENT DOCUMENTS

| | | | | |
|---|---|---|---|---|
| 8,615,106 | B2* | 12/2013 | Wedge | G06K 9/6202 382/103 |
| 9,886,624 | B1* | 2/2018 | Marty | G06K 9/00724 |
| 9,911,053 | B2* | 3/2018 | Miyano | G06K 9/00624 |
| 10,311,459 | B1* | 6/2019 | Babao | G06Q 30/0224 |
| 10,491,943 | B1* | 11/2019 | Wahlquist-Ortiz | A63F 13/46 |
| 2007/0094721 | A1* | 4/2007 | Nguyen | G07F 17/32 726/9 |
| 2008/0120328 | A1* | 5/2008 | Delgo | G06F 16/738 |
| 2010/0093421 | A1* | 4/2010 | Nyman | G06Q 20/108 463/17 |

(Continued)

*Primary Examiner* — Iman K Kholdebarin
(74) *Attorney, Agent, or Firm* — Hunton Andrews Kurth LLP

(57) ABSTRACT

Systems and methods for object recognition and association with an identity are disclosed. Systems and methods for object recognition and association with an identity are disclosed. In one embodiment, in an information processing apparatus comprising at least one computer processor, a method for object recognition and association with an identity may include: (1) receiving, from a first image capture device at a facility, a first image or a video; (2) recognizing, in the first image or video, an individual having a physical characteristic and an object in proximity to the individual; (3) associating the physical characteristic and the object with the individual; and (4) storing the association in a database.

14 Claims, 2 Drawing Sheets

(56) References Cited

U.S. PATENT DOCUMENTS

| | | | | |
|---|---|---|---|---|
| 2012/0249831 A1* | 10/2012 | Porter | .................... | H04N 5/272 |
| | | | | 348/231.3 |
| 2013/0136350 A1* | 5/2013 | Pai | ......................... | G06T 7/254 |
| | | | | 382/165 |
| 2015/0205301 A1* | 7/2015 | Gilmore | ................... | G05D 1/12 |
| | | | | 701/11 |
| 2015/0352450 A1* | 12/2015 | Burrows | ............... | A63F 13/338 |
| | | | | 463/31 |
| 2015/0355311 A1* | 12/2015 | O'Hagan | .............. | H04W 4/029 |
| | | | | 340/539.13 |
| 2016/0057565 A1* | 2/2016 | Gold | ....................... | H04W 4/80 |
| | | | | 455/41.1 |
| 2016/0101358 A1* | 4/2016 | Ibrahim | .................. | A63F 13/56 |
| | | | | 463/33 |
| 2017/0161561 A1* | 6/2017 | Marty | ................... | G05D 1/0094 |
| 2019/0213627 A1* | 7/2019 | Rudnick | ............ | G06Q 30/0201 |
| 2019/0370994 A1* | 12/2019 | Norris | ....................... | G06T 7/73 |

* cited by examiner

SYTEMS AND METHODS FOR OBJECT RECOGNITION AND ASSOCIATION WITH AN IDENTITY

RELATED APPLICATIONS

This application claims priority to U.S. Provisional Patent Application Ser. No. 62/546,717, filed Aug. 17, 2017, the disclosure of which is hereby incorporated, by reference, in its entirety.

BACKGROUND OF THE INVENTION

1. Field of the Invention

The present disclosure generally relates to systems and methods for object recognition and association with an identity.

2. Description of the Related Art

Cameras are often used to monitor areas for security purposes, to identify individuals using facial recognition, or to monitor activities at a location, such as the length of customer queues, etc. When used to identify individuals using facial recognition, however, the identity of the person may be lost when the person moves outside of the area being monitored, and the individual may need to be re-identified when the individual moves back into the monitored area. Often, a clear view of the individual's face is needed to re-identify the individual.

SUMMARY OF THE INVENTION

Systems and methods for object recognition and association with an identity are disclosed. In one embodiment, in an information processing apparatus comprising at least one computer processor, a method for object recognition and association with an identity may include: (1) receiving, from a first image capture device at a facility, a first image or a video; (2) recognizing, in the first image or video, an individual having a physical characteristic and an object in proximity to the individual; (3) associating the physical characteristic and the object with the individual; and (4) storing the association in a database.

In one embodiment, the method may further include receiving, from a second image capture device, a second image or video; recognizing, in the second image or video, the physical characteristic and the object; and identifying the individual in the second image or video based on the association with the physical characteristic and the object.

In one embodiment, a plurality of physical characteristics for the individual and a plurality of objects in proximity to the individual may be associated with the individual.

In one embodiment, the method may further include assigning the individual a unique identifier. The individual may be assigned the unique identifier after a confidence threshold is met. The confidence threshold may be based on a number and uniqueness of associated physical characteristics or objects.

In one embodiment, the method may further include receiving, from an electronic device, an identification of the individual, the identification comprising a name or an identifier. The object may comprise the electronic device, a kiosk associated with the facility, etc.

In one embodiment, the identification may be received from a beacon in communication with the information processing apparatus.

In one embodiment, the method may further include determining an identification of the individual based on at least one facial feature in the first image or video. The identification may be determined by comparing the at least one facial feature to a database comprising an association of facial features with individuals.

In one embodiment, the method may further include recognizing an orientation of the individual.

In one embodiment, the method may further include recognizing a velocity of the individual.

In one embodiment, the object may include clothing or an accessory worn by the individual.

In one embodiment, the method may further include associating the individual with another individual.

In one embodiment, the method may further include determining a role of the individual based on a location of the individual within the facility.

According to another embodiment, a system for object recognition and association with an identity may include a plurality of image capture devices at a facility; and a backend in communication with the plurality of image capture devices. A first image capture device may capture a first image or a video. The backend may receive the first image or video, recognize, in the first image or video, an individual having a physical characteristic and an object in proximity to the individual, associate the physical characteristic and the object with the individual, and store the association in a database.

In one embodiment, the backend may receive from a second image capture device, a second image or video, may recognize, in the second image or video, the physical characteristic and the object, and may identify the individual in the second image or video based on the association with the physical characteristic and the object.

In one embodiment, the backend may assign the individual a unique identifier after a confidence threshold is met. The confidence threshold may be based on a number and uniqueness of associated physical characteristics or objects.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein relate to systems and methods for object recognition and association with an identity.

Figure 1:
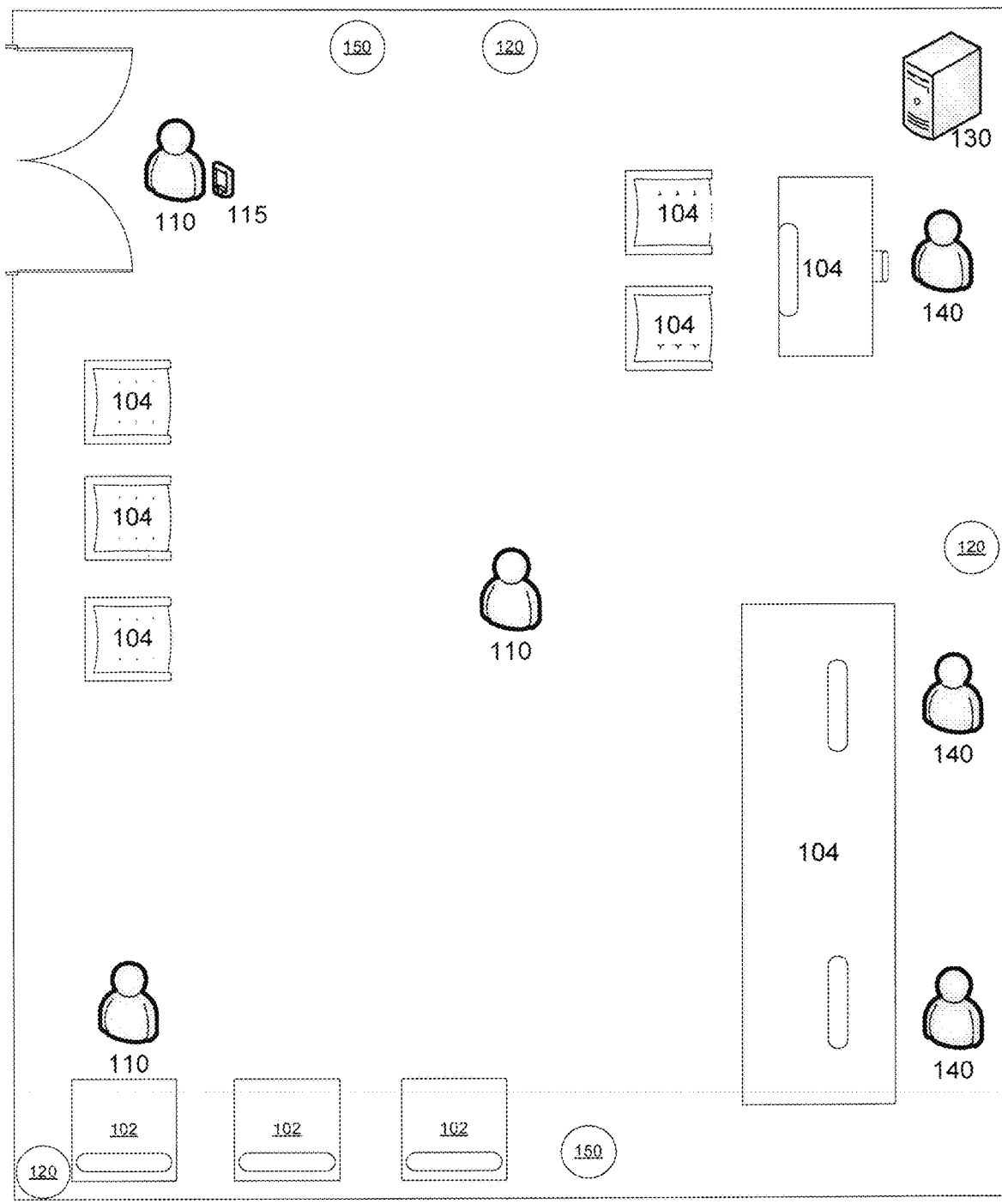
FIG. 1 depicts a system for object recognition and association with an identity according to one embodiment.

Embodiments may use object identification to associate one or more object with an identified individual. Referring to FIG. 1, a system for object identification and association is provided according to one embodiment.

Area 100 may include equipment 102, furniture 104, walls 106, etc. Other elements may be included in area 100 as is necessary and/or desired, the nature of which may vary based on the purpose of physical location, the type of business, etc. In one embodiment, a plurality of individuals, such as employees 140, customers 110, etc. may be present in area 100.

Area 100 may be monitored by one or more image capture devices 120, such as a camera. Image capture device(s) 120 may be in communication with backend 130 that may receive and process image data from image capture device(s) 120.

Image capture device(s) may be any suitable cameras, including CCD cameras. In one embodiment, cameras 120 may detect the visible spectrum, the IR spectrum, thermal gradients, etc.

Image capture device(s) 120 may capture individual images, videos, etc.

In one embodiment, image capture device(s) 120 may perform image processing, object identification, etc. on the captured images.

In one embodiment, backend 130 may process the images/video received from image capture device(s) 120 and may process the images/video to identify individuals, objects, equipment, furniture, etc. within the images/video. In one embodiment, backend 130 may associate each individual 110 or 140, object 115 or 145, equipment 102, furniture 104, etc. with a vector indicating a direction of facing/movement and a velocity of movement (if appropriate).

In one embodiment, individuals 110 and 140 may be present in area 100. Each individual 110 and 140 may have one or more feature, such as size (e.g., height and weight), hair color, skin color, facial features, etc. that may be used to identify the individual 110 and 140. In one embodiment, individual 110 and 140 may not be associated with a specific identification, such as a name; instead, individual 110 and 140 may be associated with a unique identifier that may distinguish individual 110 and 140 from other individuals in area 100.

In one embodiment, individual(s) 110 and 140 may be associated with one or more object 115 or 145, respectively. Examples of objects 115 and 145 include the type/color of clothing, eyewear, hats, shoes, bags (e.g., purses, backpacks, etc.), etc. that individual 110 or 140 is carrying or wearing.

In one embodiment, characteristics of one or more object 115 may be identified. For example, a color of a piece of clothing, materials (e.g., leather, denim, etc.), clothing features (e.g., long sleeve, short sleeve, button-down shirt, etc.), may further be used to distinguish objects 115 from each other (e.g., a blue shirt is not the same as a white shirt).

Similarly, characteristics of features of individual 110 or 140 may be used, such as hair color, size, facial hair color, skin color, etc.

In one embodiment, multiple objects 115 and features may be associated with individual 110 or 140. As the number of objects 115 and/or features increases, there may be a greater certainty in uniqueness.

In one embodiment, certain properties of objects may also lead to increased certainty in uniqueness. For example, certain features that are unlikely to change during individual's presence at a location (e.g., hair color, hair length, facial hair, skin color, etc.) and certain associated objects (e.g., shirt, pants, etc.) may provide greater certainty than objects that may be put down or may change (e.g., a phone or bag may be separated from individual 110 or 140, individual 110 or 140 may take off a jacket, etc.).

Area 100 may include one or more beacon 150 that may communicate with electronic device 115 or 145 being carried by individual 110 or 140. The beacon may be used to communicate with electronic device 115 or 145 to identify individual 110 or 140.

For example, once individual 110 or 140 is identified (for example, through facial recognition, by presenting identification to an agent, by a beacon, by conducting a transaction, by thermal signature, etc.), one or more objects 115 or 145, respectively, may be associated with individual 110 or 140. In addition, non-facial characteristics, such as hair color, skin color, size, etc. may be associated with individual 110 or 140. Thus, by associating objects 115 or 145 with identified individual 110 or 140, respectively, objects 115 or 145 may be used to track individual 110 or 140, for example, when individual 110 or 140's face is out range of image capture device 120. In another embodiment, objects 115 or 145 may be used with facial recognition as well.

In one embodiment, individual 110 or 140's activities may also be associated with individual 110 or 140. For example, in a banking environment, an individual using equipment 102, such as ATM, sitting on furniture 104, etc. may have that use associated therewith. In one embodiment, a vector may be generated for equipment 102, furniture 104, etc. based on the orientation of equipment 102, furniture 104.

In one embodiment, "primary" objects 102 or 104, such as electronic devices, furniture, etc. first may be recognized, and then elements that may be associated with the primary objects 102 or 104 may be recognized in order to determine the orientation of the primary object 102 or 104, if applicable. For example, in a bank branch environment, there may be multiple screens and keypads. By recognizing an ATM, and then a screen and keyboard associated with that ATM, the orientation of the ATM may be determined. A different algorithm may be used to determine the orientation of different devices and/or accessories as is necessary and/or desired.

In one embodiment, based on the identity of individual 110 or 140, targeted ads, messages, offers, information, etc. may be presented to individual 110 while individual 110 waits, when individual 110 uses the device, etc.

Similarly, individual 110 interacting with employee 140 may sit opposite a computer workstation. A vector may be created for the workstation based on the location of the screen, keyboard, etc. relative to each other, and the roles of individual 110 and employee 140 may be determined based on their respectively positions relative to the workstation. The roles may then be associated with the individual 110 and employee 140.

In another embodiment, the queue length for an ATM or other device 102 may be monitored, and the wait may be posted, for example, on-line. In addition, additional resources may be provided to address long queues.

In one embodiment, the identification and/or objects may be provided to employees 140 to assist employees 140 in recognizing individuals 110. For example, employee 140 may be informed that his or her next appointment is sitting in the waiting area and carrying a black backpack.

In one embodiment, data from a location may be used to identify patterns and may result in changes in resource allocation (e.g., greater/fewer number of agents, equipment, etc.).

Figure 2:
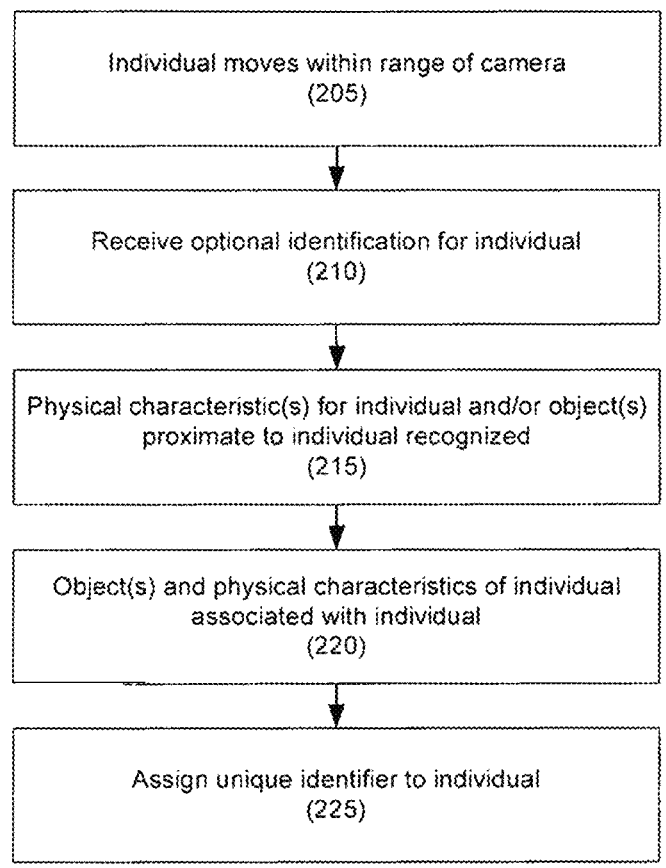
FIG. 2 depicts a method for object recognition and association with an identity according to one embodiment.

Referring to FIG. 2, a method for object recognition and association with an identity is disclosed according to one embodiment.

In step 205, an individual may move within the range of a camera, and the camera may capture one or more image, video, etc. of the individual.

In one embodiment, the camera may provide the image(s) or video to a backend for processing. In another embodiment, the camera may process the images.

In one embodiment, the camera and/or backend may detect one or more physical characteristic of the individual. For example, the individual's facial features, size (e.g., height and weight), hair color, skin color, etc. may be used to uniquely identify the individual.

In step 210, the camera or the backend may optionally receive an identification for the individual. In one embodiment, the camera and/or backend may receive information from a beacon that may receive information from an electronic device that the individual may be carrying. In another embodiment, the camera and/or backend may identify the individual based on, for example, comparing facial characteristic(s) with those stored in a database.

In one embodiment, known facial-recognition software and techniques may be used, and the features may be compared to features stored in a database to identify the individual.

In still another embodiment, identifying information may be received from the individual (e.g., a sign-in at the facility, the use of an electronic device at the facility that requires identification, such as an ATM), may be received and input by an employee (e.g., a receptionist greeting the individual, an employee assisting the individual, etc.), etc.

In one embodiment, the individual may not be specifically identified (e.g., by name). For example, the individual may be assigned a unique identifier that may be used to track the individual. If the individual is identified by name, the individual's identity may then be updated.

In step 215, one or more object that is associated with the individual, or a physical characteristic of the individual, may be recognized. For example, the individual may be wearing or carrying a coat, a hat, eyeglasses, shoes, a purse, a pet, a backpack, an electronic device, etc., or may be carrying an electronic device (e.g., a smartphone, tablet computer, smartwatch, etc.), etc. In one embodiment, physical characteristic, such as color, size, shape, etc. may be identified.

In another embodiment, a vector may be associated with the individual. For example, as the individual moves within a location, the direction and/or speed of the individual may be used to predict the next camera with which the user will be detected.

In one embodiment, the role of the individual may be identified. For example, if the individual is interacting with equipment for customers (e.g., an ATM, a kiosk, etc.), the individual may be determined to be a customer. If the individual is working at a workstation, the individual may be determined to be an employee.

In step 220, the object and/or characteristics of the object, and physical characteristics for the individual may be associated with the individual. In one embodiment, the object and/or characteristics of the object or other physical characteristic may remain associated with the individual until the individual leaves the premises. This association may be used to identify the individual as the individual is detected by different cameras even though the individual's face may not be visible.

In step 225, the individual may be assigned a unique identifier. In one embodiment, the unique identifier may be any suitable identifier that may be used to identify the individual, such as an alpha-numeric string. In one embodiment, for uniqueness, the unique identifier may include the date, time, etc.

In one embodiment, as the number of objects and/or features increases, there may be a greater confidence in uniqueness. In one embodiment, the individual may not be assigned a unique identifier until a confidence threshold is met that gives a certain level of confidence that the individual can be uniquely identified.

In one embodiment, algorithms and/or machine learning may be used to determine when sufficient information has been gathered to uniquely identify the individual. For example, in a busy area, hair color and a backpack may not provide sufficient uniqueness to distinguish individuals. Thus, additional objects and/or features may be necessary.

In one embodiment, the amount of information needed to uniquely identify the individual may be dynamic, and may vary based on, for example, the location, the number of individuals at the location, the time of day, time of year, etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, objective C, Swift, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for object recognition and association with an identity comprising:
   in an information processing apparatus comprising at least one computer processor:
   receiving, from a first image capture device at a facility, a first image or a video;
   recognizing, in the first image or video, an individual having a plurality of physical characteristics;
   detecting one or more physical characteristics from the plurality of characteristics associated with the individual;
   detecting one or more objects in proximity of the individuals, wherein the one or more objects are associated with the individual;
   determining a confidence value for the individual, wherein the confidence value depends on a type and a number of the one or more physical characteristics and the one more objects detected in association with the individual;
   associating a unique identifier with the individual in response to the confidence value exceeding a prescribed threshold value;
   storing the unique identifier along with the one or more physical characteristics and the one or more objects associated with the individual, in a database.

2. The method of claim 1, further comprising:
   receiving, from a second image capture device, a second image or video;
   recognizing, in the second image or video, the one or more physical characteristics and the one or more objects detected in the first image; and
   associating the individual in the second image or video with the unique identifier.

3. The method of claim 1, further comprising:
   receiving, from an electronic device, an identification of the individual, the identification comprising a name or an identifier.

4. The method of claim 3, wherein the electronic device comprises a mobile device associated with the individual.

5. The method of claim 3, wherein the electronic device comprises a kiosk associated with a facility.

6. The method of claim 3, wherein the identification is received from a beacon in communication with the information processing apparatus.

7. The method of claim 1, wherein the one or more physical characteristics comprise at least one facial feature in the first image or video.

8. The method of claim 7, wherein the identification is determined by comparing the at least one facial feature to a database comprising an association of facial features with individuals.

9. The method of claim 1, further comprising:
   recognizing an orientation of the individual based on a location of the one or more objects associated with the individual.

10. The method of claim 1, further comprising:
    recognizing a velocity of the individual.

11. The method of claim 1, wherein the one or more objects comprises one of clothing and an accessory worn by the individual.

12. The method of claim 1, further comprising:
    associating the individual with another individual.

13. A system for object recognition and association with an identity, comprising:
    a plurality of image capture devices at a facility; and
    a backend in communication with the plurality of image capture devices;
    wherein:
    a first image capture device captures a first image or a video;
    the backend receives the first image or video;
    the backend recognizes, in the first image or video, an individual having a plurality of physical characteristics;
    the backend detects one or more physical characteristics from the plurality of characteristics associated with the individual;
    the backend detects one or more objects in proximity of the individuals, wherein the one or more objects are associated with the individual;
    the backend determines a confidence value for the individual, wherein the confidence value depends on a type and a number of the one or more physical characteristics and the one more objects detected in association with the individual;
    the backend associates a unique identifier with the individual in response to the confidence value exceeding a prescribed threshold value;

the backend stores the unique identifier along with the one or more physical characteristics and the one or more objects, associated with the individual, in a database.

14. The system of claim 13, wherein the backend receives from a second image capture device, a second image or video;

the backend recognizes, in the second image or video, the one or more physical characteristics and the one or more objects detected in the first image; and the backend associates the individual in the second image or video with the unique identifier.

\* \* \* \* \*